United States Patent [19]
Collins et al.

[11] 3,894,989
[45] July 15, 1975

[54] ORGANOTIN COMPOUND STABILIZERS FOR HALOGENATED POLYMERS

[75] Inventors: John Desmond Collins, Albrighton; Harold Coates, Wombourn; Iftikhar Hussain Siddiqui, Birmingham, all of England

[73] Assignee: Albright & Wilson Limited, Oldbury, Warley, West Midlands, England

[22] Filed: Nov. 23, 1973

[21] Appl. No.: 418,591

[30] Foreign Application Priority Data
Nov. 29, 1972 United Kingdom............... 55042/72
Sept. 10, 1973 United Kingdom............... 42451/73

[52] U.S. Cl. ... 260/45.75 S; 260/45.75 J; 260/429.7
[51] Int. Cl. ............................................. C08f 45/62
[58] Field of Search ............................. 260/45.75 K

[56] References Cited
UNITED STATES PATENTS

| | | | |
|---|---|---|---|
| 2,641,596 | 6/1953 | Leistner et al.................... | 260/45.75 |
| 2,744,876 | 5/1956 | Ramsden.......................... | 260/45.75 |
| 3,019,247 | 1/1962 | Mack et al........................ | 260/45.75 |
| 3,217,004 | 11/1965 | Hechenbleikner et al....... | 260/45.75 |
| 3,778,456 | 12/1973 | Hoye et al. ...................... | 260/45.75 |

Primary Examiner—V. P. Hoke
Attorney, Agent, or Firm—Robert P. Auber; Kenneth G. Wheeless; Robert Spector

[57] ABSTRACT

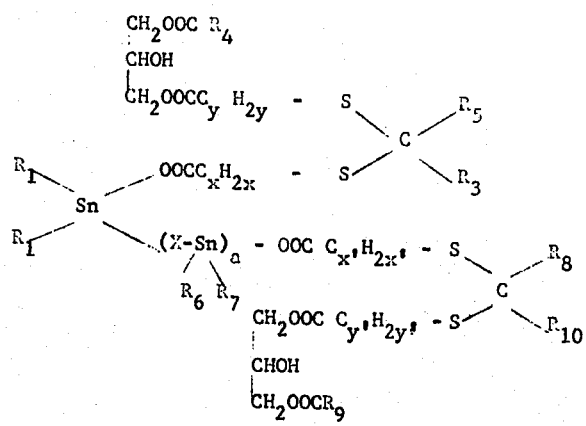

where $a$ is 0 or 1, $xx'$, $y$ and $y'$ are 1 – 6, $R_1$, $R_2$ $R_6$ and $R_7$ are $C_{1-12}$ alkyl, cycloalkyl, aromatic or aralkyl hydrocarbyl, $R_4$ and $R_9$ are as defined for $R_1$ or are $C_{13-21}$ alkyl, $C_{2-21}$ alkenyl or substituted aromatic hydrocarbyl, $R_3$, $R_5$, $R_8$ and $R_{10}$ are as defined for $R_4$ or are hydrogen or a pair of $R_3$ and $R_5$ or $R_8$ and $R_{10}$ together with the carbon atom to which they are joined forms a cycloalkyl ring and X is O or S, are stabilizers for halogen containing resins, especially PVC.

5 Claims, No Drawings

ORGANOTIN COMPOUND STABILIZERS FOR HALOGENATED POLYMERS

The present invention relates to organotin compounds and to their use as stabilizers for polymeric materials, in particular halogenated resins such as polymers and copolymers of vinyl chloride and vinylidene chloride.

The use of organotin compounds containing sulphur as stabilizers for halogenated resins has for many years been recognised as being highly effective. However, the compounds employed have normally been those having a comparatively high tin content and so, in view of the high cost of tin, are expensive relative to other available stabilisers. Thus, despite their high efficiency these compounds are still not as widely used as other, less effective, materials.

The compounds of the present invention are sulphur-containing organotin compounds which have a lower tin content than most conventional sulphur-containing organotin compounds and so are potentially cheaper.

Accordingly, the present invention provides new chemical compounds of the formula:

I
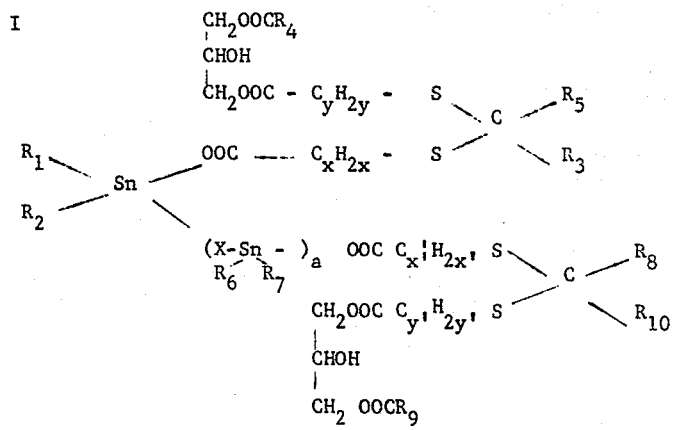

wherein $a$ is 0 or 1, each of $R_1$, $R_2$, $R_6$ and $R_7$, which are the same or different, is an alkyl group of 1 to 12 carbon atoms, cycloalkyl group, aromatic hydrocarbyl group, e.g., of 6 to 19 carbon atoms, e.g., phenyl or aralkyl hydrocarbyl group, e.g., of 7 to 19 carbon atoms such as benzyl, each of $R_4$ and $R_9$, which are the same or different, is as defined above for $R_1$, $R_2$, $R_6$ and $R_7$ or is an alkyl group of 13–21 carbon atoms, an alkenyl group of 2–21 carbon atoms or an inertly substituted aromatic hydrocarbon group, wherein the substituent is preferably at least one group of formula —OH, —OR$_4$, —SR$_4$, —COOR$_4$, —OOCR$_4$ or —SSR$_4$, each of $R_3$, $R_5$, $R_8$ and $R_{10}$, which are the same or different, is as defined above for $R_4$ and $R_9$, or is hydrogen or at least one of the pairs $R_3$ and $R_5$, and $R_8$ and $R_{10}$ together with the carbon atom to which they are attached forms a cyclo alkyl ring, preferably a cyclohexane ring, each of $x$, $x'$, $y$ and $y'$, which are the same or different is an integer of 1–6, and X is oxygen or sulphur.

Preferably the compounds are symmetric with $R_1$, $R_2$, $R_3$, $R_4$, $R_5$, $x$ and $y$ the same respectively as $R_6$, $R_7$, $R_8$, $R_9$, $R_{10}$, $x'$ and $y'$. $R_1$, $R_2$, $R_6$ and $R_7$ are preferably $C_4$ to $C_8$ alkyl, e.g., n-butyl or n-octyl groups or cycloalkyl groups of 5 – 7 carbon atoms, e.g., cyclohexyl groups. $R_5$ and $R_{10}$ are preferably hydrogen or alkyl of 1 to 6 carbon atoms, e.g., methyl groups. $R_4$ and $R_9$ are normally alkyl or alkenyl groups of 10 to 19 carbon atoms, preferably linear ones, e.g., of formula $CH_3(CH_2)_z$—, where $z$ is an integer of 9–18, preferably 10–16 and especially 17. $R_3$ and $R_8$ are preferably phenyl or substituted phenyl (the substitutents being for example alkyl of 1 to 6 carbon atoms especially methyl, or alkoxy of 1 to 6 carbon atoms, especially methoxy or hydroxy) groups, branched chain alkyl group of 3 – 10 preferably 4 – 8 carbon atoms preferably those in which the free valency is at the point of branching, i.e., of formula —CH $R_{11}$ $R_{12}$, where $R_{11}$ and $R_{12}$ are alkyl groups of 1 to 6 carbon atoms especially ethyl and butyl e.g. pent - 3 - yl and hept - 3 - yl groups or straight chain alkyl groups of 7 to 13 carbon atoms e.g. n-nonyl and n-undecyl groups. $x$ and $x'$ are preferably 1 or 2, $y$ and $y'$ are preferably 1 or 2, and X is preferably oxygen. The groups $C_xH_{2x}$, $C_x$ , $H_{2x}$ $C_yH_{2y}$ and $C_y$ $H_{2y}$ are preferably linear, e.g., of formula $(CH_2)_x$.

In preferred compounds of formula I, the groups

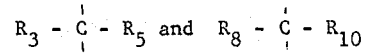

are the same and represent groups of formula $-\overset{|}{C}H - CH(C_2H_5)_2$ ,  $-\overset{|}{C}H - \underset{C_2H_5}{CH(CH_2)_3CH_3}$ $-\underset{CH_3}{\overset{|}{C}} - (CH_2)_8CH_3$ ,  $-\overset{|}{\underset{||}{C}} - (CH_2)_{10} CH_3$ , $- CH -\underset{OH}{\underset{|}{\langle\ \rangle}}$  or  $-CH -\langle\ \rangle-OCH_3$ .

When $a$ is 0, the compounds of the present invention are of the formula:

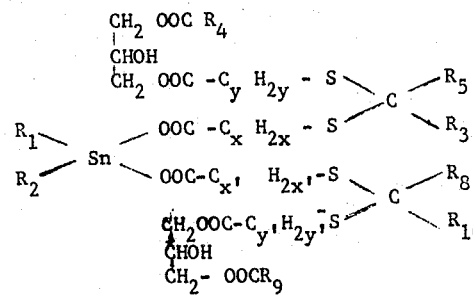
II

In the above formula II, $R_4$ and $R_9$ is preferably of formula $(CH_2)_zR_{13}$, $R_3$, $R_8$ and $R_{13}$ are each an alkyl group of 1 to 13 carbon atoms a cycloalkyl group, an aryl or aralkyl group, $R_5$ and $R_{10}$ are hydrogen, an alkyl or an aryl group and z is an integer of 1 to 20. $R_{13}$ is most preferably a methyl group. The groups $C_xH_{2x}$, $C_{x'}H_{2x'}$, $C_yH_{2y}$ AND $C_{y'}H_{2y'}$ are preferably $(CH_2)_x$, $(CH_2)_{x'}$, $(CH_2)_y$ and $(CH_2)_{y'}$.

When $a$ is 1, the compounds of the present invention are of the formula:

III

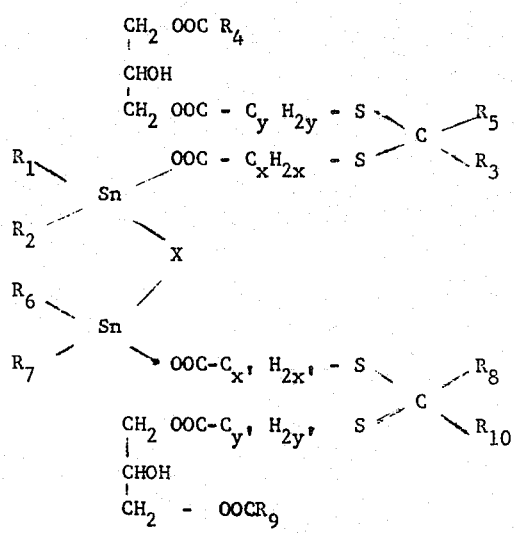

In a second aspect the invention provides a process for preparing the compounds of the invention by reacting at least one precursor of formula IV

IV

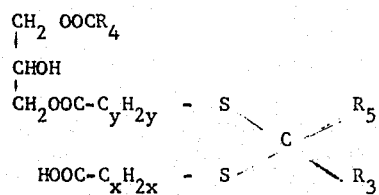

or formula V

V

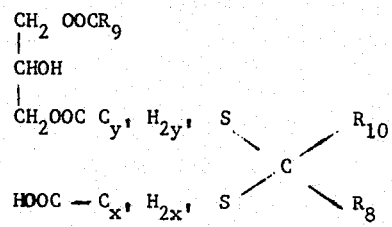

with at least one tin compound of formula $R_1R_2SnO$, $R_6R_7SnO$, $R_1R_2SnS$ or $R_6R_7SnS$.

If the ratio of the total number of moles of tin compound to the total number of moles of precursors is at least 1:1, then compounds of formula III are formed. If the ratio of the total number of moles of tin compound to the total number of moles of precursors is 0.5 : 1 or less than compounds of formula I, wherein $a$ is 0 (i.e., of formula II) are formed. When the ratio is between 0.5:1 and 1:1 both compounds of formula II and III are formed.

The process can be carried out in several different ways. Thus to prepare the symmetrical compounds of formula III, one mole of a precursor of formula IV can be reacted directly with at least one mole of tin compound of formula $R_1R_2SnO$ (when X in the compound of formula I is oxygen) or at least one mole of tin compound of formula $R_1R_2SnS$ (when X in the compound of formula I is sulphur).

To prepare the symmetrical compounds of formula II one mole of precursor can be reacted with 0.5 mole of tin compound of formula $R_1R_2Sn$ O or $R_1R_2$ SnS. These symmetrical compounds of formula II can be converted into compounds of formula III by reaction with at least 0.5 mole (per mole of the compound of formula II) of tin compound of formula $R_1R_2SnO$ (when X is to be oxygen) or $R_1R_2SnS$ (when X is to be sulphur). The compounds of formula III can be converted into those of formula II by treatment with more precursor compounds of formula IV and/or V, e.g., with an extra 0.5 mole precursor per mole of compound of formula III.

The precursors of formula IV can be prepared by reacting at least one mole of a mono ester of glycerol of formula $HOCH_2$ $CHOH$ $CH_2OCOR_4$ with one mole of a mercapto carboxylic acid of formula HS $C_yH_{2y}$ COOH to produce an intermediate of formula HS $C_yH_{2y}$ COO $CH_2CHOH$ $CH_2OCO$ $R_4$, reacting this intermediate with a carbonyl compound of formula $R_3R_5CO$ and a mercapto carboxylic acid of formula $HSC_xH_{2x}$ COOH to produce the precursor of formula IV, the intermediate, carbonyl compound and latter mercapto carboxylic acid being used in about equimolar amounts. A corresponding sequence of reactions can be used to prepare the precursors of formula V.

To prepare asymmetric compounds of formula I, precursors of formula IV and V, which are different, are used if the assymmetry is in the part of the molecule derived from the precursors, and for compounds of formula I, where $a$ is 1, at least two organotin compounds, one containing $R_1$ and $R_2$ groups and the other different $R_6$ and $R_7$ groups, are used if the asymmetry is in the groups attached to tin.

Frequently all the reactions to form the compounds of formula I are carried out in the same solvent medium, which may be an aromatic hydrocarbon, e.g., benzene, toluene or xylene, an aliphatic hydrocarbon, e.g., hexane or petroleum ether b.p. (80° or a cycloaliphatic hydrocarbon, e.g., cyclohexane. It is often desirable to have an acidic catalyst present in the reaction, e.g., p-toluene sulphonic acid, hydrochloric acid or a metal chloride suitable as a Friedel Crafts catalyst, such as zinc chloride.

Examples of compounds of formula II according to the invention include:

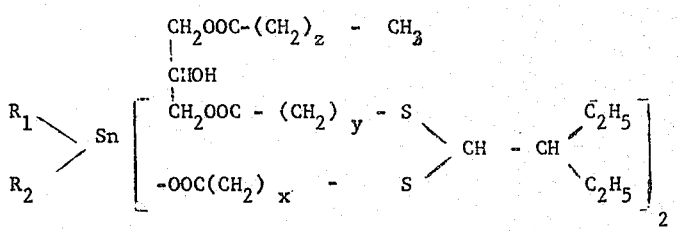

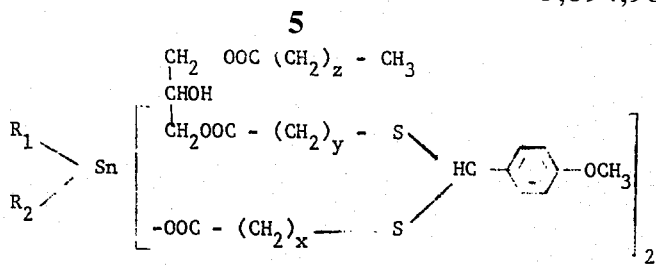
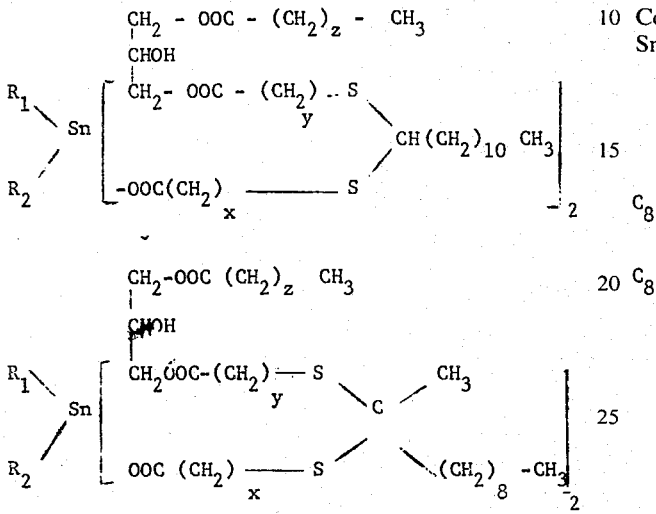
Particular compounds of formula II according to the present invention include:
VI
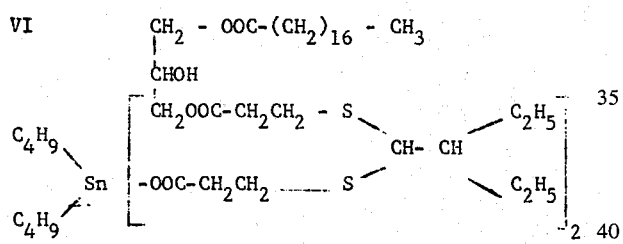
VII
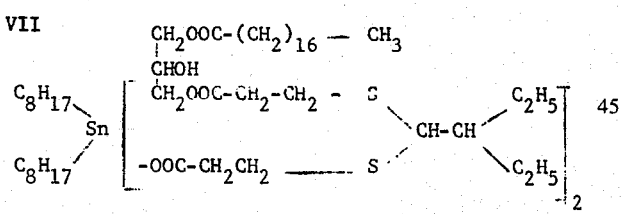
VIII
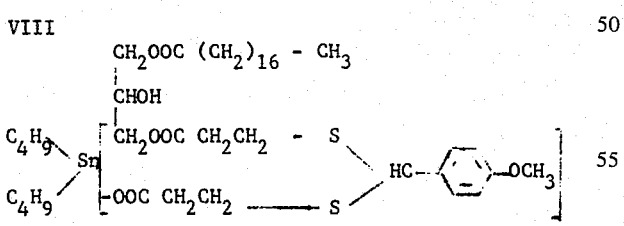
IX
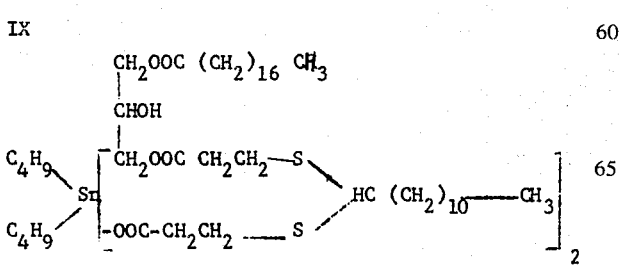
Corresponding compound fo formula IX with $(C_8H_{17})_2$ Sn instead of $(C_4H_9)_2$ is of formula X
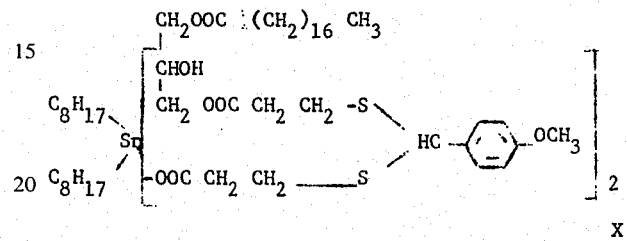
X
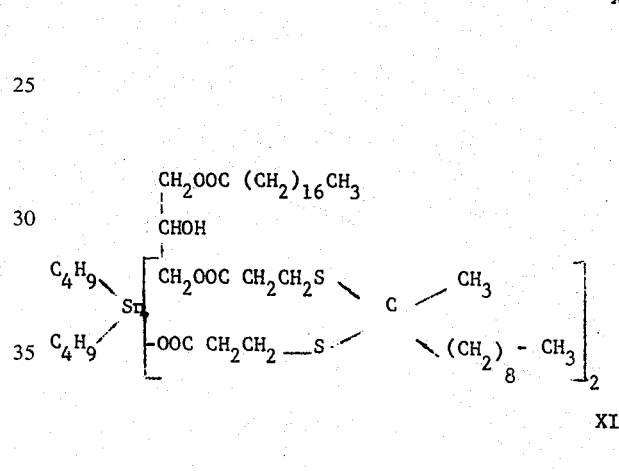
XI
Particular compounds of formula III according to the present invention include:
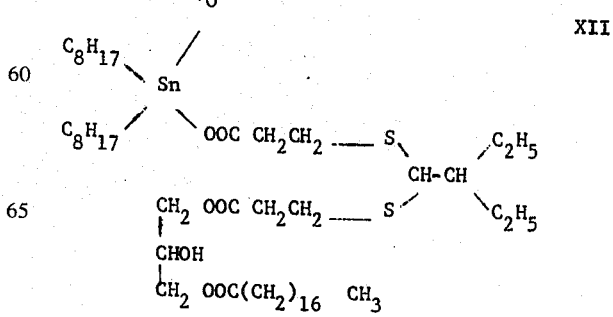
XII

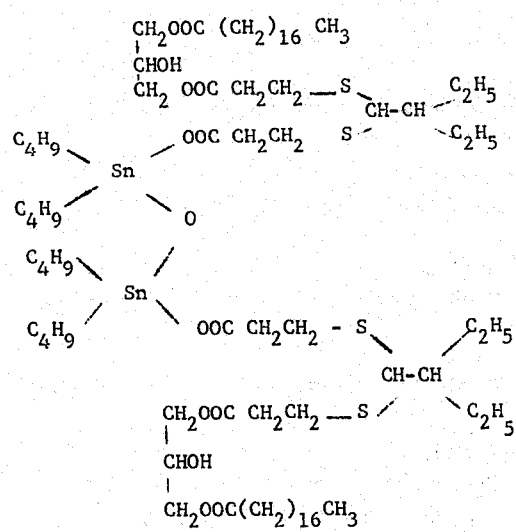

XIII

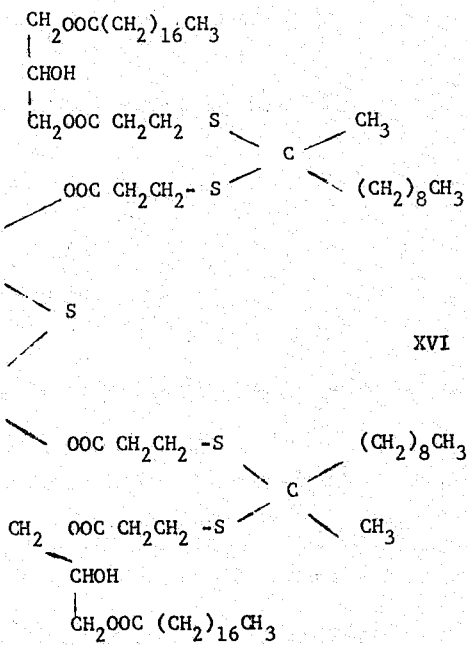

XVI

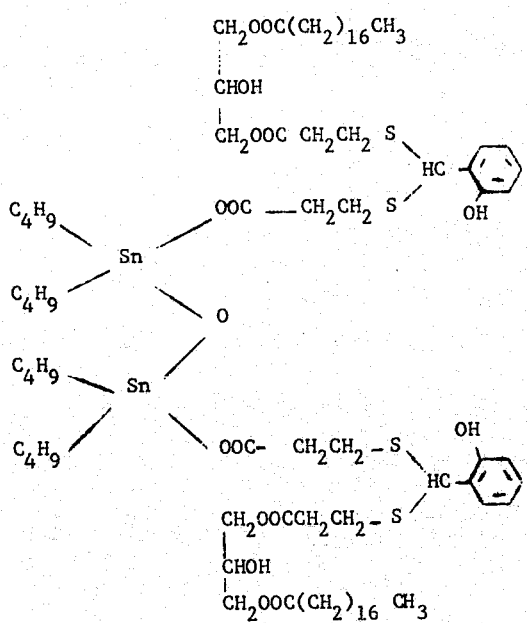

XIV

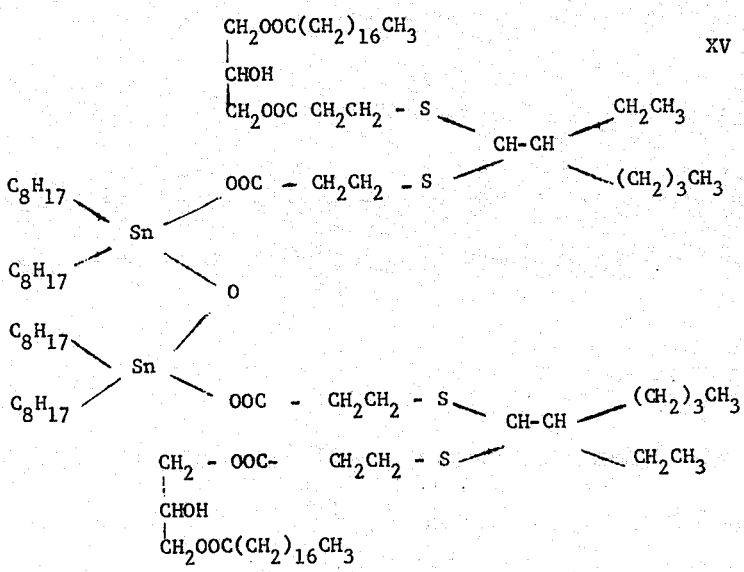

XV

Compounds according to the invention find use as stabilisers for halogen-containing resins, that is for polymers or copolymers of vinyl chloride or vinylidene chloride, chlorinated vinyl chloride polymers and chlorinated polyethylene. Accordingly, from a further aspect the present invention provides a composition which comprises a halogen-containing resin and as a stabiliser therefore a compound of the formula I.

The organotin compounds will be present in compositions according to the invention in amounts so as to produce the desired stabilising effect; often this will be from 0.01 – 10%, preferably 0.2 –5% and especially 2 to 3% by weight based on the total amount of polymeric resin present.

It has also been found that by mixing 1 – 50% by weight (based on the weight of the organotin compound of the invention) of a monoalkyltin compound such as a monoalkyltin tris (mercapto glycollate) ester of a $C_{1-20}$ alkanol e.g. monobutyltin tris (iso-octyl thioglycollate) with the organotin compound, the stabilizing efficiency of the compound increases. Preferably 5

– 25% based on total amount of organotin compound is used. Other additives which also improve the initial clarity of polymer during thermal tests with organotin compounds are:
  a. Butyl epoxy stearate (B.E.S.)
  b. Mono-octyltin tri (iso-octyl thioglycollate)
  c. Dibutyltin sulphide and oxide
  d. Dibutyltin cyclic mercapto acetate and/or Dibutyltin cyclic β-mercapto propionate and/or Dioctyltin cyclic mercapto acetate and/or Dioctyltin cyclic β-mercapto propionate.

Optionally, but advantageously, compositions according to the invention also contain hindered phenols, that is those having at least one alkyl substituent in a position ortho to the hydroxyl group, as auxiliary stabilisers. Such phenols preferably have 1 – 8 carbon atoms in each alkyl group, which is especially a tertiary butyl group. Examples of such phenols include butylated hydroxy-anisole, 2,6-di-tert.-butylphenol, methylene bis-(2,4-di-tert.-butylphenol), methylene bis-(2,6-di-tert.-butylphenol), methylene bis-(2,6-di-tert.-butyl-3-methylphenol), 4,4'-butylidene bis-(6-tert.-butyl-3-methylphenol), methylene bis-(4-ethyl-6-tert.-butylphenol), methylene bis-(4-methyl-2,6-di-tert.-butylphenol). Particularly preferred, however, is 2,6-di-tert.-butyl-4-methyl-phenol.

Such phenols may be present in an amount of up to 3% preferably from 0.01 to 0.05% by weight of the resin and will normally be present at about 4–10% by weight, preferably 5–8% based on the total amount of organotin compounds used.

Esters of phosphorous and thiophosphorous acid may be employed in compositions according to the invention. Such compounds include halo-phosphites such as tris chloropropyl phosphite and polymeric phosphites such as those from hydrogenated 44'-isopropylidene diphenol. Preferred phosphites and thiophosphites, however, are monomers having no substituents in the organo-group and having no more than one sulphur atom. These include triaryl phosphites and trialkyl phosphites. Such compounds include, for example, triphenyl phosphite, trixylylphosphite, trinonyl phenyl phosphite and trioctyl phosphite. Diesters of phosphorous acid such as di-isopropyl phosphite, dibutyl phosphite and diphenyl phosphite are also of use. Particularly preferred, however, are the mixed alkyl aryl phosphites such as octyl diphenyl phosphite, isodecyl diphenyl phosphite and diisodecyl phenyl phosphite. This particularly pronounced effect may also be obtained by employing a mixture of a triaryl phosphite and an alcohol in conjunction with the organotin compound. A particularly suitable mixture is that of triphenyl phosphite and isodecanol.

The stabiliser composition of the invention can also contain an epoxy compound, as may be desired for example in cases where a delay of initial colour change of the polymer is desired. Epoxy compounds which may be employed in such compositions include butyl epoxy stearate, esters of epoxidised oleic acid and compounds of the formula Organotin formulations as described above, optionally including a hindered phenol, an alkyl aryl phosphite or aryl phosphite or an epoxide, will often be used as the only stabiliser in a polymeric vinyl chloride or vinylidene chloride compositions. However, if desired conventional thermal stabilisers may also be included. These may include, for example, metal soap stabilisers, such as cadmium, barium, or zinc salts of fatty acids, or lead salts such as lead carbonate or stearate or dibasic lead phosphite or phthalate, or tribasic lead sulphate or conventional organotin stabilisers such as dibutyltin dilaurate or dibutyltin maleate or sulphur-containing compounds such as dibutyltin bisthioglycollates.

In the practice of the invention the stabiliser formulation may be mixed with the copolymer resin in the conventional manner for example by milling with the resin on heated rolls at 100°–160°C e.g. about 150°C., although higher temperatures may be used when convenient, or by being mixed with particles of the polymer and then melting and extruding the mixture or by adding the stabiliser to a liquid resin.

Resins which may be used in compositions according to the invention normally contain at least 40% by weight of chlorine. Usually it will be a polymer or copolymer of vinyl chloride or or vinylidene chloride but post-halogenated polyvinyl chloride or post-halogenated polyolefines, such as polyethylene, may be employed if desired, Suitable monomers which may form such copolymers with vinyl chloride and vinylidene chloride include for example acrylonitrile, vinyl acetate, methyl methacrylate, diesters of fumaric acid and maleic acid, ethylene, propylene and lauryl vinyl ether and these co-monomers may be present in an amount of up to 25% of the total weight of monomers copolymerised.

The organotin stabiliser formulation may be employed in either plasticised resin compositions, for example those plasticised with carboxylic ester plasticisers, e.g., di-2-ethylhexyl phthalate, dibutyl sebacate or di-isooctyl phthalate or with phosphate esters such as tri(alkyl phenyl) phosphates or may be employed in rigid compositions. Such rigid compositions contain little or no plasticisers although for some applications up to about 10% by weight of plasticiser may be present. This is in contrast with plasticised compositions where the amount of plasticisers present is normally greater than 50% by weight of the polymeric material and is often greater than 100% on that basis; amounts of 30–150% are often used.

In addition to the stabilizers, the composition of the invention may also contain conventional additives, e.g., pigments, fillers, dyes and ultraviolet absorbing agents.

The invention is illustrated in the following Examples:

EXAMPLE 1

Preparation of Compound of Formula VI.
Glycerol mono stearate (34.8g, 0.1M) and β-mer-

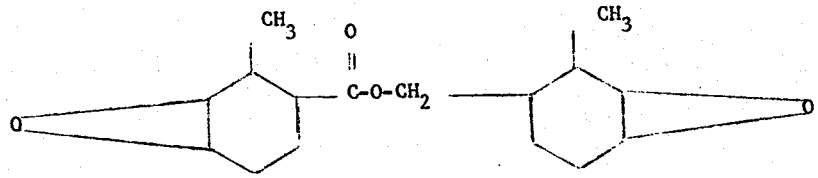

captopropionic acid (10.6g, 0.1M) were refluxed in toluene (250 ml) in presence of p-toluene sulphonic acid (ca. 0.2g–0.3g) till the calculated amount of water had collected [to give $C_{17}H_{35}COOCH_2$—$CH(OH)$—$CH_2OOC$—$CH_2CH_2 SH.$]

2-ethyl butyraldehyde (10.0g, 0.1M) and $\beta$-mercaptopropionic acid (10.6g, 0.1M) were also added into the above warm solution and the mixture refluxed until the calculated amount of water had collected again

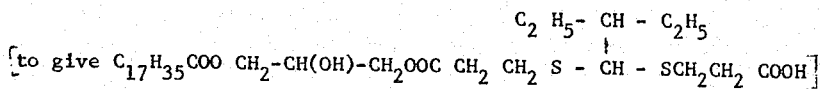

[to give $C_{17}H_{35}COO\ CH_2\text{-}CH(OH)\text{-}CH_2OOC\ CH_2\ CH_2\ S\ -\ CH\ -\ SCH_2CH_2\ COOH$]

After cooling the solution dibutyltin oxide (12.5g, 0.05M) was added to the solution and the mixture refluxed until a clear solution was obtained. The hot solution was thus filtered under vacuum and finally the toluene was removed from the warm solution under reduced pressure.

The product is a white soft waxy solid at room temperature.

Analysis

| | Calculated | Found |
|---|---|---|
| | Sn = 7.9% | Sn = 8.07% |
| | S = 8.5% | S = 8.69% |

Its structure was also confirmed by I.R. and N.M.R.

EXAMPLE 2

Preparation of Compound of Formula VII.

This compound was prepared by the same method as in Example 1 using the following quantities:

| Step (1) | (a) Glycerol mono stearate | 34.8g |
|---|---|---|
| | (b) $\beta$-Mercaptopropionic acid | 10.6g |
| | (c) p-toluene sulphonic acid | ca.0.2 g |
| | (d) toluene | 250 ml |
| Step (2) | (e) 2-ethyl butyraldehyde | 10 g |
| | (f) $\beta$-mercaptopropionic acid | 10.6 g |
| Step (3) | (g) Dioctyltin oxide | 18.1 g |

The product is a white soft waxy-like solid at room temperature.

Analysis

| | Calculated | Found |
|---|---|---|
| | Sn = 7.37% | Sn = 6.4% |
| | S = 7.9 % | S = 8.4% |

Its structure was also confirmed by I.R. and N.M.R.

EXAMPLE 3

Preparation of Compound of formula VIII.
It was prepared by the same method as in Example 1 using the following quantities:
It was prepared by the same method as in Example 1 using the following quantities:

| Step (1) | (a) Glycerol mono stearate | 34.8 g |
|---|---|---|
| | (b) $\beta$-Mercaptopropionic acid | 10.6 g |
| | (c) p-toluene sulphonic acid | ca.0.3g |
| | (d) Toluene | 300 ml |
| Step (2) | (e) Anisaldehyde | 13.6 g |
| | (f) $\beta$-mercaptopropinic acid | 10.6 g |
| Step (3) | (g) Dibutyltin oxide | 12.5 g |

The product is a slightly yellow, soft wax-like solid at room temperature.

Analysis

| | Calculated | Found |
|---|---|---|
| | Sn = 7.55% | Sn = 7.4% |
| | S = 8.14% | S = 7.5% |

Its structure was also confirmed by I.R. and N.M.R.

EXAMPLE 4

Preparation of compound of formula X.
It was prepared by the same method as in Example 1 using the following quantities:

| Step (1) | (a) glycerol mono stearate | 34.8 g |
|---|---|---|
| | (b) $\beta$-mercaptopropionic acid | 10.6 g |
| | (c) p-toluene sulphonic acid | ca.0.2g |
| | (d) toluene | 300 ml |
| Step (2) | (e) dodecylaldehyde | 18.4 g |
| | (f) $\beta$-mercaptopropionic acid | 10.6 g |
| Step (3) | (g) dioctyltin oxide | 18.0 g |

The product is a white soft wax-like solid at room temperature.

Analysis

| | Calculated | | Found | |
|---|---|---|---|---|
| | Sn = | 6.7% | Sn = | 6.3% |
| | S = | 7.1% | S = | 6.7% |
| | C = | 63.4% | C = | 62.54% |
| | H = | 10.1% | H = | 10.52% |

Its structure was also confirmed by I.R.

EXAMPLE 5

Preparation of compound of Formula IX.
It was prepared exactly by the same method and using the same quantities of starting materials as in Example 4, with the difference in step (3) i.e. using dibutyltin oxide (12.5g) instead of dioctyltin oxide.

The product is a white soft wax-like solid at room temperature.

Analysis

| | Calculated | Found |
|---|---|---|
| | Sn = 7.12% | Sn = 7.0% |
| | S = 7.67% | S = 7.4% |

EXAMPLE 6

Preparation of compound of formula XI.

It was prepared exactly by the same method and using the same quantities of starting materials as in Example (1), with the difference in step (2) i.e. using Methyl Nonyl ketone (17g 0.1M) instead of 2-Ethyl Butyraldehyde.

The product is a white soft wax-like solid at room temperature.

Analysis

|    | Calculated | Found |
|----|------------|-------|
| Sn | 7.24%      | 6.76% |
| S  | 7.8%       | 7.25% |
| C  | 61.5%      | 60.5  |
| H  | 9.7%       | 9.83% |

The structure was also confirmed by I.R. and N.M.R. analysis.

EXAMPLE 7

$$(C_8H_{17})_2 Sn \begin{bmatrix} CH_2OOC\ (CH_2)_{16}\ CH_3 \\ CHOH \\ CH_2OOC\ CH_2CH_2\ S \\ \\ -\ OOC\ CH_2CH_2\ S \end{bmatrix} CH - CH \begin{matrix} C_4H_9 \\ \\ C_2H_5 \end{matrix} \Bigg]_2$$

This compound was prepared by the same method as in Example 1 but using the following materials and quantities.

| Step (1) | (a) glycerol monostearate | 69.6 g |
|----------|---------------------------|--------|
|          | (b) β-mercaptopropionic acid | 21.2 g |
|          | (c) p-toluene sulphonic acid | ca 0.3 g |
|          | (d) Toluene | 200 ml |
| Step (2) | (e) β-mercapto propionic acid | 21.2 g |
|          | (f) 2-ethyl hexanal | 25.6 g |
| Step (3) | (g) Dioctyltin oxide | 36.1 g |

The product is a white waxy solid at room temperature, whose structure was confirmed by its infra red and n m r spectra.

Analysis

|    | Calculated | Found  |
|----|------------|--------|
| Sn | 7.1%       | 7.0%   |
| S  | 7.6%       | 8.0%   |
| C  | 61.9%      | 61.1%  |
| H  | 9.95%      | 9.96%  |

EXAMPLE 8

Preparation of compound of formula XIII.

The final hot solution obtained in Example 1 and containing the compound of formula VI was cooled, dibutyltin oxide (12.5g., 0.05M) was added thereto and the mixture refluxed until a clear solution was obtained. The hot solution was then filtered under vacuum and finally the toluene was removed from the warm solution under reduced pressure to leave the product as a white soft waxy solid at room temperature.

Analysis

|    | Calculated | Found  |
|----|------------|--------|
| Sn | 13.5%      | 12.65% |
| S  | 7.3%       | 7.3%   |
| C  | 56.2%      | 55.01% |
| H  | 9.03%      | 8.77%  |

Its structure was also confirmed by I.R. and N.M.R.

EXAMPLE 9

Preparation of compound of formula XII.

This compound was prepared by heating the final solution obtained by the method of Example 2 and containing the compound of formula VII(32.2g. 0.02 M) and dioctyltin oxide (7.2 gms, 0.02 M) with constant stirring and heating to reflux till a clear solution was obtained. The product was isolated as described in Example 8. The product is a white soft waxy solid at room temperature.

Analysis

|       | Calculated | Found  |
|-------|------------|--------|
| Sn%=  | 12.0       | 11.5   |
| S% =  | 6.4        | 6.9    |
| C% =  | 60.7       | 61.79  |
| H% =  | 9.6        | 9.65   |

Its structure was also confirmed by I.R. and N.M.R. analysis.

EXAMPLE 10

Preparation of compound of formula XIV.

This compound was prepared by the same method as in Example 8 using the following quantities:

| Step (1) | (a) Glycerol mono stearate | 34.8 g. |
|----------|----------------------------|---------|
|          | (b) β-Mercaptopropionic acid | 10.6 g. |
|          | (c) p-toluene sulphonic acid | Ca. 0.2 g. |
|          | (d) toluene | 200 ml. |
| Step (2) | (e) Salicylaldehyde | 12.2 g. |
|          | (f) β-mercaptopropionic acid | 10.6 g. |
| Step (3) | (g) dibutyltin oxide | 12.5 g. |
| Step (4) | (h) dibutyltin oxide | 12.5 g. |

The product is a slightly yellow waxy solid at room temperature.

Analysis

|  | Calculated |  | Found |
|---|---|---|---|
| Sn = | 13.2% | Sn = | 12.2% |
| S = | 7.1% | S = | 7.3% |

Its structure was also confirmed by I.R. and N.M.R.

EXAMPLE 11

Preparation of compound of formula XV.

This compound was prepared by the same method as in Example 9, i.e., by heating dioxyltin oxide (10.8g., 0.03M) and the final solution obtained by the method of Example 7 and containing

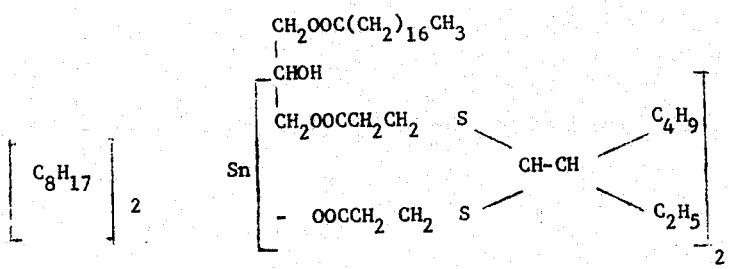

(50 g., 0.3 M) with constant stirring and heating to reflux till a clear solution was obtained.

The product is a slightly yellow coloured solid at room temperature.

Analysis

|  | Calculated |  | Found |
|---|---|---|---|
| Sn = | 11.7% | Sn = | 11.4% |
| S = | 6.3% | S = | 7.0% |
| C = | 60.3% | C = | 60.5% |
| H = | 9.7% | H = | 9.9% |

EXAMPLE 12

Preparation of compound of formula XVI.

This compound was prepared by the same method as in Example 11 by heating dibutyltin sulphide (5.3g, 0.02 M) and the final solution obtained by the method of Example 6 and containing the compound of formula XI (32.8g, 0.02 M) with constant stirring till a clear solution was obtained.

The product is a white waxy solid at room temperature.

Analysis

|  | Found % |  | Calculated % |
|---|---|---|---|
| Sn = | 11.75 | Sn = | 12.4 |
| S = | 7.6 | S = | 8.4 |
| C = | 57.9 | C = | 58.0 |
| H = | 9.8 | H = | 9.3 |

EXAMPLE 13

Polyvinyl chloride resins containing compounds of Examples 1–7 and 8–12 were tested for initial colour development against known stabilisers (with and without mono-butyltin tri iso-octyl thioglycollate) on an equal tin basis for Examples 1–6 (Table 1) and on an equal part basis for Examples 8–12 (Table 2). Improved results were obtained in spite of the lower tin content of the compounds of the invention as compared to the known stabilizers (see Tables 1 and 2).

The known stabilizers were dibutyltin bis(iso-octyl) thioglycollate) and dioctyltin bis (iso-octyl thioglycollate) with and without monobutyltin tri(iso-octyl thioglycollate).

A series of rigid (non-plasticized) formulations was prepared from the polyvinyl chloride resin Corvic D55-/09 (100 Parts). When testing the compounds of the invention lubricant has not been added added to the polymer because the new compounds tested themselves act as a lubricant during milling at about 155°C, but with known stabilizers 0.5 parts of Lubricant (Laurex CS) (per 100 parts of Polymer) has been added (marked * in Tables 1 and 2). In some cases monobutyltin tri(iso octyl thioglycollate) has also been added (marked A in Table 2). Laurex CS is the trade name for a mixture of cetyl and stearyl alcohols.

TABLE 1

Testing of stabilisers (with and/or without additives) in comparison with known stabilizers containing equal amount of tin in Polyvinyl chloride.

| Test | Stabilizer(s) | Parts of stabiliser(s) in 100 parts of PVC | Colour on Gardner scale after heating at 190°C for given time in min. | | | |
|---|---|---|---|---|---|---|
|  |  |  | 0 | 5 | 10 | 15 |
| 1 | (a) Product Ex 1 (b) *DBT(IOT)$_2$ | (a) 1.5 (b) Tin equivalent to (a) | 0 2+ | 0 5+ | 3+ 8 | — — |
| 2 | (a) Product Ex 4 (b) *DOT(IOT)$_2$ | (a) 1.5 part (b) Tin equivalent to (a) | 0+ 5 | 2+ 6 | 9 — | — — |

TABLE 1 — Continued

Testing of stabilisers (with and/or without additives) in comparison with known stabilizers containing equal amount of tin in Polyvinyl chloride.

| Test | Stabilizer(s) | Parts of stabiliser(s) in 100 parts of PVC | 0 | 5 | 10 | 15 |
|---|---|---|---|---|---|---|
| | | | \multicolumn{4}{c}{Colour on Gardner scale after heating at 190°C for given time in min.} |

| Test | Stabilizer(s) | Parts of stabiliser(s) in 100 parts of PVC | 0 | 5 | 10 | 15 |
|---|---|---|---|---|---|---|
| 3 | (a) Product Ex 3 | (a) 2.0 part | 1 | 3 | 4 | — |
| | (b) *DBT(IOT)$_2$ | (b) Tin equivalent to (a) | 0 | 3+ | 7 | — |
| 4 | (a) Product Ex 5 | (a) 1.5 part | 1 | 3 | — | — |
| | (b) *DBT(IOT)$_2$ | (b) Tin equivalent to a | 1 | 5 | — | — |
| 5 | (a) Product Ex 2 | (a) 1.5 part | 0 | 0 | 2 | 4 |
| | (b) *DBT(IOT)$_2$ | (b) Tin equivalent to a | 3+ | 5 | 9 | 9 |
| 5(a) | (a) Prod. Ex 6 | (a) 1.5 parts | 0 | 0 | 1 | 5 |
| | (b) *DBT(IOT)$_2$ | (b) Tin equivalent to (a) | 1 | 5 | 8 | |
| 6 | (a) *DBT(IOT)$_2$ | (a) 0.3 | 4 | 5–6 | — | — |
| | (b) Product Ex 6 | (b) Tin equivalent to (a) | 0 | 1 | — | — |
| 7 | (a) *DBT(IOT)$_2$ | (a) 0.5 | 2 | 4 | 8 | — |
| | (b) Product Ex 1 | (b) Tin equivalent to (a) | 0 | 1 | 3 | — |
| 8 | (a) *(DBT(IOT)$_2$ | (a) 0.8 | 1 | 4 | 6 | 7–8 |
| | (b) Product Ex 1 | (b) Tin equivalent to (a) | 0 | 0–1 | 2 | 4 |
| 9 | (a) *DBT(IOT)$_2$ | (a) 0.166 | 7 | 9 | — | — |
| | (b) Product Ex 1 | (b) Tin equivalent to (a) | 0 | 2–3 | — | — |
| 10 | (a) *DOT(IOT)$_2$ | (a) 0.75 | 3 | 5 | 8 | 9 |
| | (b) Product Ex 2 | (b) Tin equivalent to (a) | 0 | 0 | 2 | 5 |
| 11 | (a) *DOT(IOT)$_2$ | (a) 0.5 | 6 | 7 | 9 | — |
| | (b) Product Ex 2 | (b) Tin equivalent to (a) | 0 | 0 | 3 | — |
| 12 | (a) *DOT(IOT)$_2$ | (a) 0.3 | 6 | 8 | — | — |
| | (b) Product Ex 2 | (b) Tin equivalent to (a) | 0 | 1 | — | — |
| 13 | (a) *DBT(IOT)$_2$ | 1.0 | 3 | 4 | 5 | |
| | (b) Product Ex 8 | 1.0 | 0 | 0 | 1–2 | |
| | (c) " | 0.9 | 0 | 0 | 1–2 | |
| | (d) " | 0.8 | 0 | 0 | 2 | |
| | (e) " | 0.7 | 0 | 0 | 3 | |
| 13(a) | (a) DOT(IOT)$_2$ | 1.0 | 0 | 1 | 4 | |
| | (b) Product Ex 7 | 0.75 | 0–1 | 2 | 8 | |
| 14 | (a) *DBT(IOT)$_2$ | 1.0 | 3 | 4 | 5–6 | |
| | (b) Product Ex 8 | 1.0 | 0 | 0 | 1–2 | |
| | (c) *DBT(IOT)$_2$(95)+A(5) | 1.0 | 2 | 3 | 5–6 | |
| | (d) Product Ex 8(95)+A(5) | 1.0 | 0 | 0 | 1–2 | |
| | (e) *DBT(IOT)$_2$(90)+A(10) | 1.0 | 0–1 | 2 | 5 | |
| | (f) Product Ex 8(90)+A(10) | 1.0 | 0 | 0 | 1–2 | |
| 15 | (a) *DBT(IOT)$_2$ | 1.0 | 2 | 3 | 4–5 | |
| | (b) Product Ex 8 | 1.0 | 0 | 0 | 1–2 | |
| | (c) *DBT(IOT)$_2$(85)+A(15) | 1.0 | 0–1 | 1–2 | 4 | |
| | (d) Product Ex 8(85)+A(15) | 1.0 | 0 | 0 | 1 | |
| | (e) *DBT(IOT)$_2$(80)+A(20) | 1.0 | 0 | 1 | 4 | |
| | (f) Product Ex 8 (80)+A(20) | 1.0 | 0 | 0 | 1 | |
| 16 | (a) *DBT(IOT)$_2$ | 1.0 | 2 | 3 | 4–5 | |
| | (b) Product Ex 8 | 1.0 | 0 | 0 | 1–2 | |
| | (c) *DBT(IOT)$_2$(75)+A(25) | 1.0 | 0 | 1 | 2–3 | |
| | (d) *DBT(IOT)$_2$(70)+A(30) | 1.0 | 0 | 0 | 2–3 | |
| | (e) *DBT(IOT)$_2$(65)+A(35) | 1.0 | 0 | 0 | 2–3 | |
| | (f) *DBT(IOT)$_2$(60)+A(40) | 1.0 | 0 | 0 | 2–3 | |
| 17 | (a) *DOT(IOT)$_2$ | 1.0 | 0 | 2 | 4–5 | |
| | (b) Product Ex 9 | 1.0 | 0 | 0 | 2 | |
| 18 | (a) *DOT(IOT)$_2$ | 1.5 | 0 | 1–2 | 4 | |
| | (b) Product Ex 9 | 1.5 | 0 | 0 | 2 | |

TABLE 1 – Continued

Testing of stabilisers (with and/or without additives) in comparison with known stabilizers containing equal amount of tin in Polyvinyl chloride.

| Test | Stabilizer(s) | | Parts of stabiliser(s) in 100 parts of PVC | Colour on Gardner scale after heating at 190°C for given time in min. | | | |
|---|---|---|---|---|---|---|---|
| | | | | 0 | 5 | 10 | 15 |
| 19 | (a) | *DBT(IOT)$_2$ | 1.0 | 3 | 4 | 5 | |
| | (b) | * " | 1.5 | 1 | 2 | 4 | |
| | (c) | Product Ex 10 | 1.5 | 0 | 0 | 1–2 | |
| | (d) | " | 1.0 | 0 | 0 | 1–2 | |
| | (e) | " | 0.6 | 0 | 0–1 | 1–2 | |
| 20 | (a) | *DOT(IOT)$_2$ | 1.0 | 3 | 4–5 | 5 | |
| | (b) | Product Ex 11 | 1.0 | 0 | 0 | 2 | |
| | (c) | " | 0.8 | 0 | 0 | 2–3 | |
| | (d) | " | 0.6 | 0 | 0 | 3 | |
| 21 | (a) | *DBT(IOT)$_2$ | 1.0 | 1 | 3 | 5–6 | |
| | (b) | Product Ex 12 | 1.0 | 0 | 0 | 2–3 | |
| | (c) | " | 0.8 | 0 | 0 | 2–3 | |
| | (d) | " | 0.6 | 0 | 0 | 4 | |
| | (e) | " | 0.4 | 0 | 0 | >7 | |

Symbols are as follows:
A - represents monobutyltin tri iso-octyl thioglycollate
* - represents 0.5 parts of lubricant
( ) - denotes wt. percentage
DBT(IOT)$_2$ - represents dibutyltin bis-(iso-octyl thioglycollate)
DOT(IOT)$_2$ - represents dioctyltin bis(iso-octyl thioglycollate)

We claim:
1. A polymeric composition comprising a halogen-containing resin and, a stabilizer therefor, 0.01 – 10%, based on the weight of said composition of an organotin compound of the general formula

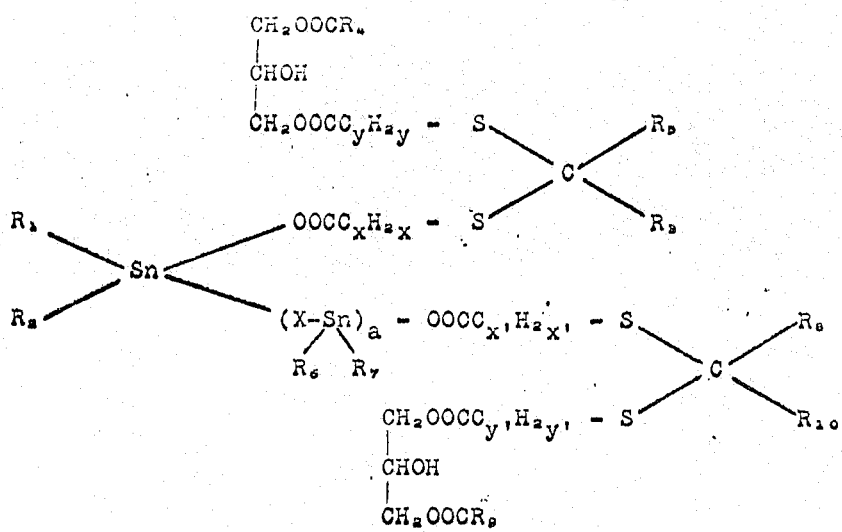

wherein $a$ is 0 or 1,
each of $x$, $x'$, $y$ and $y'$, which are the same or different, is an integer of 1 – 6
each of $R_1$, $R_2$, $R_6$ and $R_7$, which are the same or different is an alkyl group of 1 to 12 carbon atoms, a cycloalkyl group, an aromatic hydrocarbyl group or an aralkyl hydrocarbyl group, each of $R_4$ and $R_9$, which are the same or different, is as defined above for $R_1$, $R_2$, $R_6$ and $R_7$ or is an alkyl group of 13 – 21 carbon atoms, an alkenyl group of 2 to 21 or an inertly substituted aromatic hydrocarbon group, each of $R_3$, $R_5$, $R_8$ and $R_{10}$, which are the same or different, is as defined above for $R_4$ and $R_9$, or is hydrogen or at least one of the pairs $R_3$ and $R_5$ and $R_8$ and $R_{10}$, together with the carbon atom to which they are attached, forms a cycloalkyl ring, and X is oxygen or sulphur.

2. A composition according to claim 1 wherein in the organotin compound $a$ is 0, $R_1$, $R_2$, $R_6$ and $R_7$ are the same and are n-butyl or n-octyl, $R_3$ and $R_8$ are the same and are phenyl, o-hydroxyphenyl, p-methoxyphenyl, hept-3-yl, pent-3-yl, n-nonyl or n-undecyl groups, $R_4$ and $R_9$ are n-heptadecyl groups, $R_5$ and $R_{10}$ are the same and are hydrogen or methyl, $x$, $x'$, $y$ and $y'$ are the same and are 1 or 2.

3. A composition according to claim 1 wherein in the organotin compound $a$ is 1, $R_1$, $R_2$, $R_6$, and $R_7$ are the same and are n-butyl or n-octyl groups, $R_3$ and $R_8$ are the same and are phenyl, o-hydroxyphenyl, p-methoxyphenyl, hept-3-yl, pent-3-yl, n-nonyl or n-undecyl groups, $R_4$ and $R_9$ are n-heptadecyl groups, $R_5$ and $R_{10}$ are the same and are hydrogen or methyl, $x, x'$,

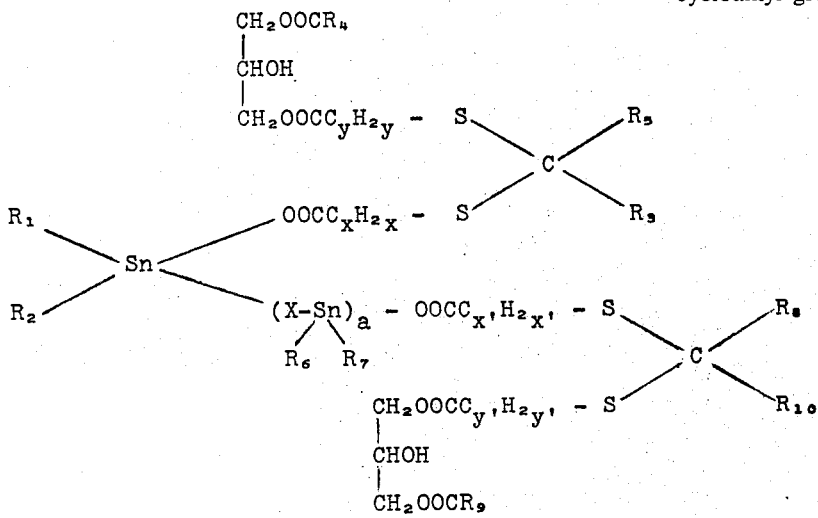

$y$ and $y'$ are the same and are 1 or 2, and X is oxygen or sulphur.

4. A polymeric composition which comprises a halogen-containing resin and, as a stabilizer therefor, 0.01–10% by weight of an organotin compound of the general formula wherein $a$ is 0 or 1,
each of $x, x', y$ and $y'$, which are the same or different, is an integer of 1 – 6
each of $R_1$, $R_2$, $R_6$ and $R_7$, which are the same or different is an alkyl group of 1 to 12 carbon atoms, a cycloalkyl group, an aromatic hydrocarbyl group or an aralkyl hydrocarbyl group, each of $R_4$ and $R_9$, which are the same or different, is as defined above for $R_1$, $R_2$, $R_6$ and $R_7$ or is an alkyl group of 13 – 21 carbon atoms, an alkenyl group of 2 to 21 or an inertly substituted aromatic hydrocarbon group, each of $R_3$, $R_5$, $R_8$ and $R_{10}$, which are the same or different, is as defined above for $R_4$ and $R_9$, or is hydrogen or at least one of the pairs $R_3$ and $R_5$ and $R_8$ and $R_{10}$, together with the carbon atom to which they are attached, forms a cycloalkyl ring, and X is oxygen or sulphur, and 1–50%, based on the weight of said organotin compound, of a monoalkyltin tri(mercaptoglycollate ester) wherein the alcohol residue of said ester contains between 1 and 20 carbon atoms, inclusive.

5. A composition for stabilizing a halogen-containing resin, the composition comprising an organotin compound of the general formula

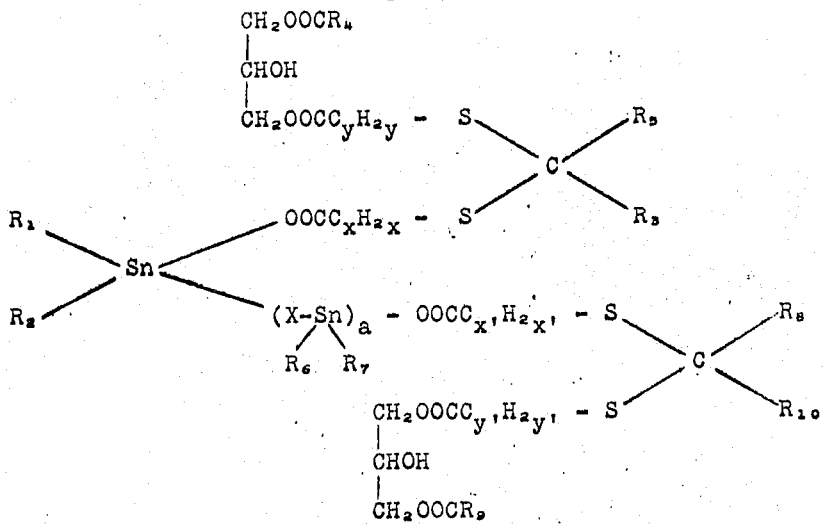

wherein $a$ is 0 or 1,
each of $x, x', y$ and $y'$, which are the same or different, is an integer of 1 – 6
each of $R_1$, $R_2$, $R_6$ and $R_7$, which are the same or different is an alkyl group of 1 to 12 carbon atoms, a cycloalkyl group, an aromatic hydrocarbyl group or an aralkyl hydrocarbyl group, each of $R_4$ and $R_9$, which are the same or different, is as defined above for $R_1$, $R_2$, $R_6$ and $R_7$ or is an alkyl group of 13 – 21 carbon atoms, an alkenyl group of 2 to 21 or an inertly substituted aromatic hydrocarbon group, each of $R_3$, $R_5$, $R_8$ and $R_{10}$, which are the same or different, is as defined above for $R_4$ and $R_9$, or is hydrogen or at least one of the pairs $R_3$ and $R_5$ and $R_8$ and $R_{10}$, together with the carbon atom to which they are attached, forms a cycloalkyl ring, and X is oxygen or sulphur, and 1–50%, based on the weight of said organotin compound, of a monoalkyltin tri(mercaptoglycollate ester) wherein the alcohol residue of said ester contains between 1 and 20 carbon atoms, inclusive.

* * * * *